US008128057B2

(12) United States Patent
Swinford

(10) Patent No.: US 8,128,057 B2
(45) Date of Patent: Mar. 6, 2012

(54) METHODS AND APPARATUS FOR REGULATING GAS TURBINE ENGINE FLUID FLOW

(75) Inventor: Mark Douglas Swinford, Centerville, OH (US)

(73) Assignee: General Electric Company, Schenectady, NY (US)

(*) Notice: Subject to any disclaimer, the term of this patent is extended or adjusted under 35 U.S.C. 154(b) by 965 days.

(21) Appl. No.: 12/040,453

(22) Filed: Feb. 29, 2008

(65) Prior Publication Data

US 2009/0217986 A1 Sep. 3, 2009

(51) Int. Cl.
*F16K 31/12* (2006.01)

(52) U.S. Cl. ............. 251/58; 251/62; 251/305; 123/337

(58) Field of Classification Search .................... 251/58, 251/62, 305, 304, 229, 279; 123/337; 60/785, 60/782

See application file for complete search history.

(56) References Cited

U.S. PATENT DOCUMENTS

| | | | | |
|---|---|---|---|---|
| 3,539,147 | A * | 11/1970 | Paul, Jr. | 251/58 |
| 3,690,615 | A * | 9/1972 | Rogers | 251/31 |
| 3,737,142 | A * | 6/1973 | Boswell et al. | 251/58 |
| 3,765,438 | A * | 10/1973 | Di Sciascio | 137/219 |
| 3,892,381 | A * | 7/1975 | Prescott et al. | 251/26 |
| 3,902,694 | A * | 9/1975 | Friedell | 251/58 |
| 3,946,986 | A * | 3/1976 | Sutter et al. | 251/298 |
| 4,299,373 | A * | 11/1981 | Troyer | 251/58 |
| 4,353,390 | A * | 10/1982 | Karpenko | 137/527.8 |
| 4,527,769 | A * | 7/1985 | Stogner et al. | 251/14 |
| 4,533,113 | A * | 8/1985 | Francart, Jr. | 251/63.4 |
| 5,392,812 | A * | 2/1995 | Herron | 137/527.8 |
| 5,676,110 | A * | 10/1997 | Meneely | 123/323 |
| 6,775,990 | B2 | 8/2004 | Swinford | |
| 6,986,257 | B2 * | 1/2006 | Swinford | 60/785 |

* cited by examiner

*Primary Examiner* — John Fristoe, Jr.
*Assistant Examiner* — Marina Tietjen
(74) *Attorney, Agent, or Firm* — David J. Clement; Trego, Hines & Ladenheim, PLLC

(57) ABSTRACT

A valve assembly may include a body having an axis and a flow tube attached to the body for flowing a fluid therethrough, the flow tube having a first bend and a second bend. The valve assembly may further include a valve attached to the flow tube having an axle that is perpendicular to the axis, and a piston attached to the body and the axle and parallel to the axis.

7 Claims, 7 Drawing Sheets

METHODS AND APPARATUS FOR REGULATING GAS TURBINE ENGINE FLUID FLOW

BACKGROUND OF THE INVENTION

The exemplary embodiments relate generally to gas turbine engines and more particularly, to valve assemblies used to regulate fluid flow for gas turbine engines.

Gas turbine engines typically include a compressor, a combustor, and at least one turbine. The compressor may compress air, which may be mixed with fuel and channeled to the combustor. The mixture may then be ignited for generating hot combustion gases, and the combustion gases may be channeled to the turbine. The turbine may extract energy from the combustion gases for powering the compressor, as well as producing useful work to propel an aircraft in flight or to power a load, such as an electrical generator.

Gas turbine engines typically include an engine casing that extends circumferentially around the compressor and turbine. Within at least some known engines, a plurality of ducts and valves coupled to an exterior surface of the casing are used to channel fluid flow from one area of the engine for use within another area of the engine or for exhausting overboard. For example, such ducts and valves may form a portion of an environmental control system (ECS).

At least some known valve assemblies are used to control fluid flow that is at a high temperature and/or high pressure. Such valve assemblies include a substantially cylindrical valve body that is coupled between adjacent sections of ducting. The valve body includes a valve sealing mechanism that is selectively positionable to control fluid flow through the valve. More specifically, at least some known valves include a piston/cylinder arrangement that is positioned external to the valve body and is coupled to the valve sealing mechanism to provide the motive force necessary to selectively position the valve sealing mechanism.

Because the piston/cylinder arrangement is offset from the main valve body, a center of gravity of the valve assembly is typically displaced a distance from a centerline axis of the valve body. Such an eccentric center of gravity may induce bending stresses into the valve assembly, adjoining tubing, and supporting brackets during engine operation. Depending on the application, the physical size and weight of the piston/cylinder arrangement may also present difficulties during the duct routing phase of the engine design.

Some known valve assemblies have attempted to overcome these issues by including a bend in the ducting leading to the valve sealing mechanism. The intent of this change was to orient the valve sealing mechanism to be perpendicular to the piston and to orient the force transfer pins to be perpendicular to the piston travel direction. However, this design requires the use of a wishbone arrangement intermediate between the piston and the valve sealing mechanism. The wishbone could cause vibration modes with resultant unacceptable linkage wear issues or part stresses. The wishbone also included slots for the connection pins, which could allow dirt and moisture to enter the actuator cavity.

BRIEF DESCRIPTION OF THE INVENTION

In one exemplary embodiment, a valve assembly may include a body having an axis and a flow tube attached to the body for flowing a fluid therethrough, the flow tube having a first bend and a second bend. The valve assembly may further include a valve attached to the flow tube having an axle that is perpendicular to the axis, and a piston attached to the body and the axle and parallel to the axis.

In another exemplary embodiment, a valve assembly may include a body having an axis and a flow tube attached to the body for flowing a fluid therethrough. The valve assembly may further include a valve attached to the flow tube having an axle that is substantially perpendicular to the axis, the axle being offset from a plane parallel to the axle and passing through the axis.

DETAILED DESCRIPTION OF THE INVENTION

Figure 1:
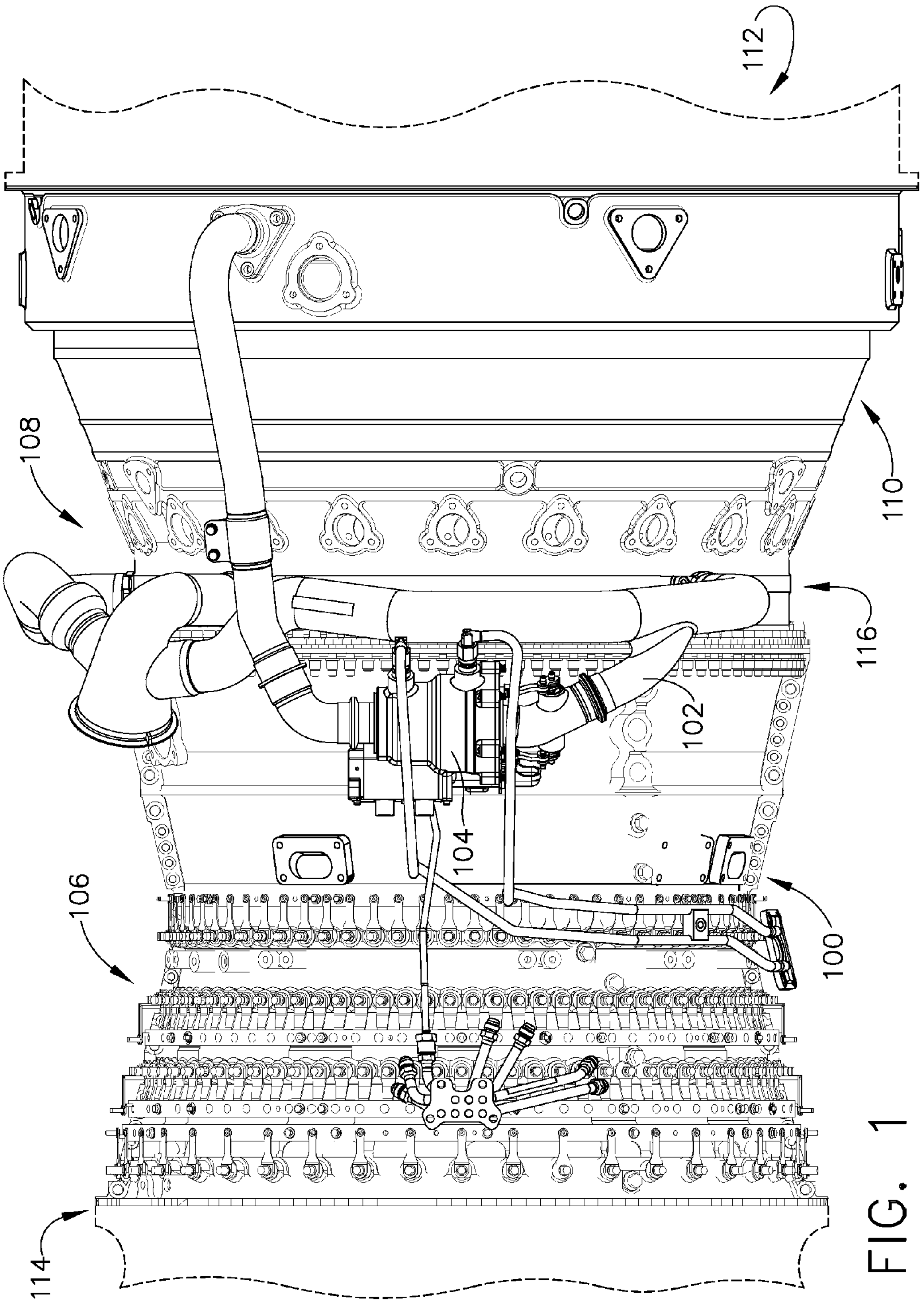
FIG. 1 is a bottom view of an exemplary gas turbine engine.
Figure 2:
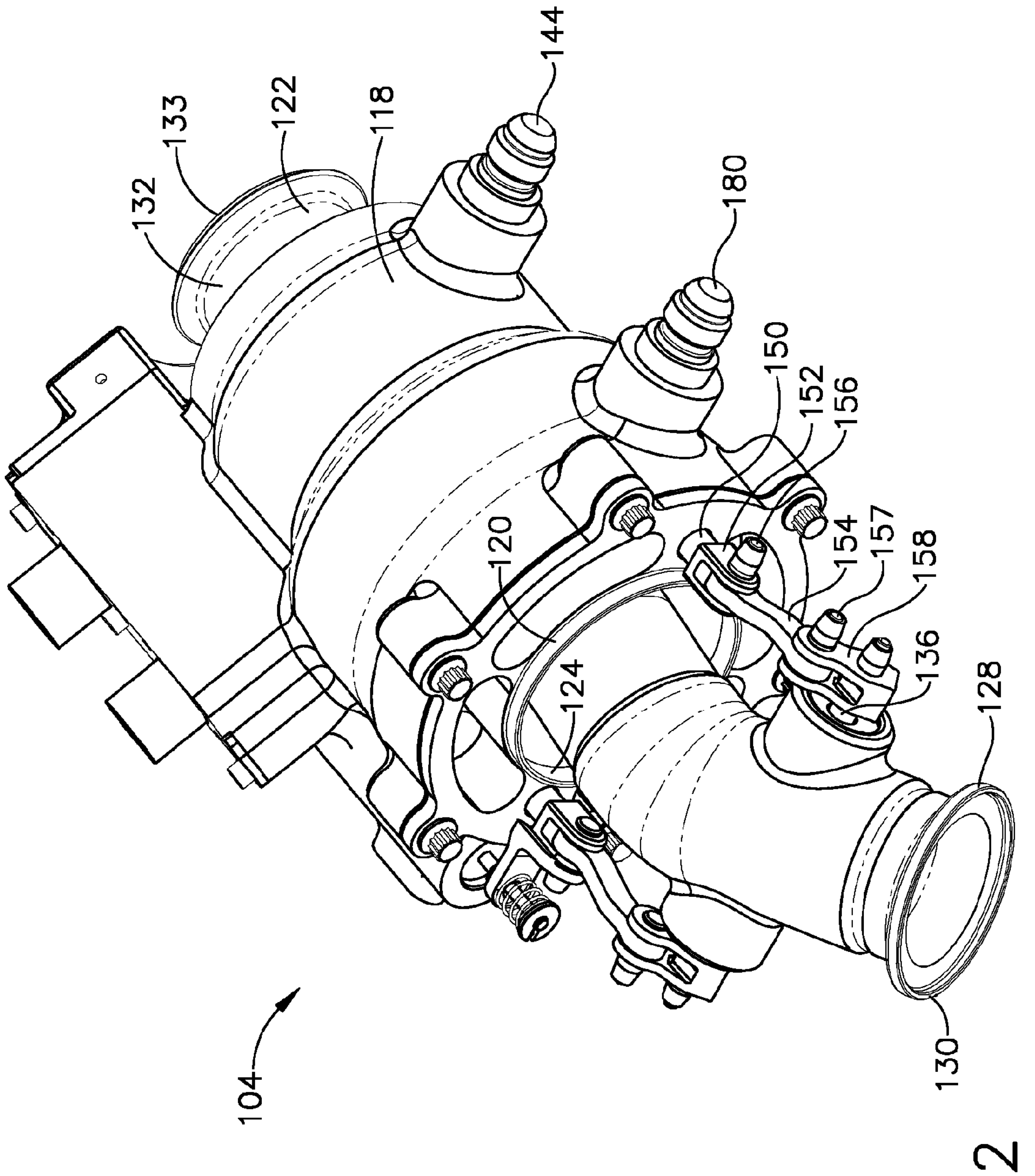
FIG. 2 is a perspective view of one exemplary embodiment of a valve assembly.
Figure 3:
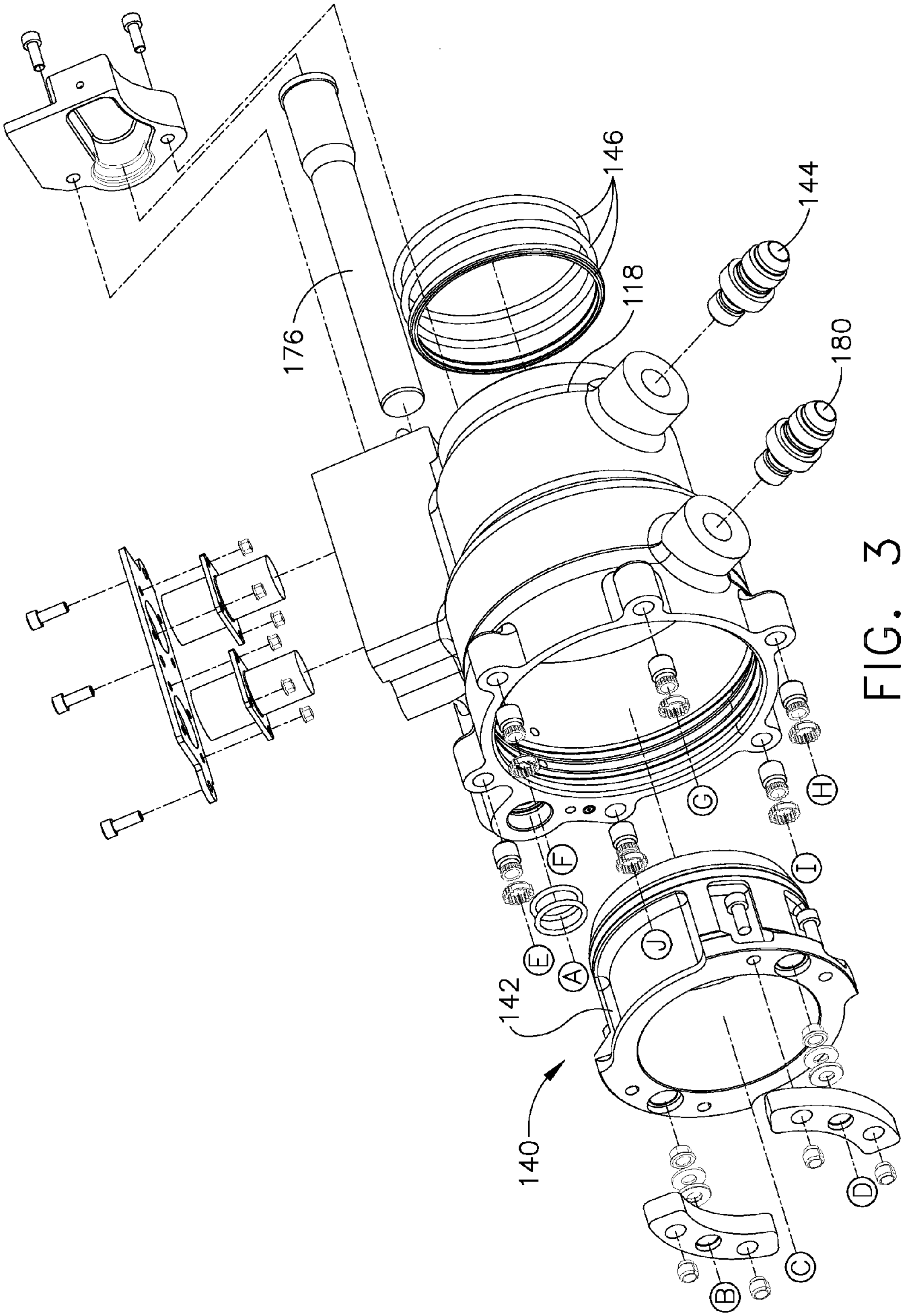
FIG. 3 is an exploded perspective view of the outer part of one exemplary embodiment of a valve assembly.
Figure 4:
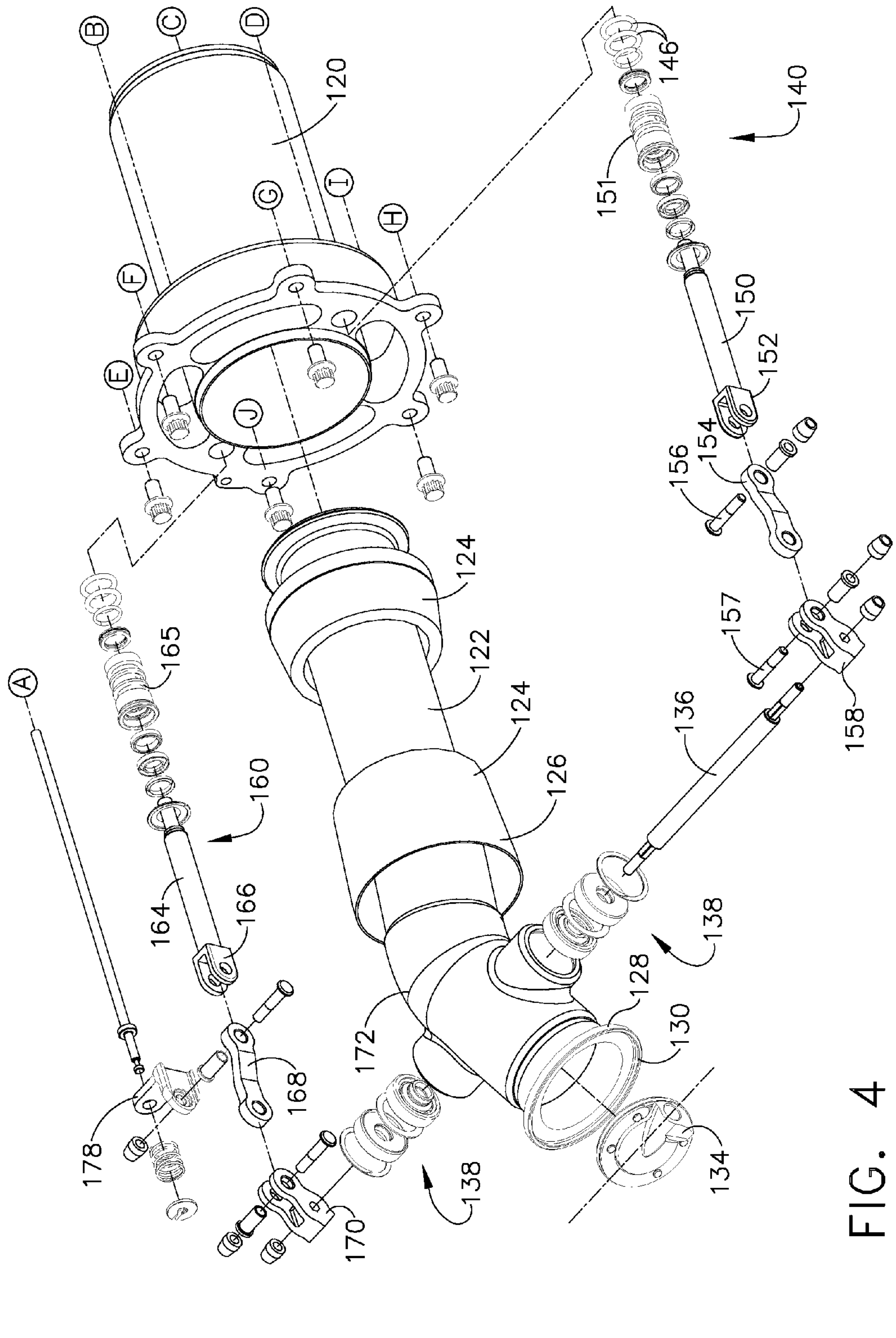
FIG. 4 is an exploded perspective view of the inner part of one exemplary embodiment of a valve assembly.
Figure 5:
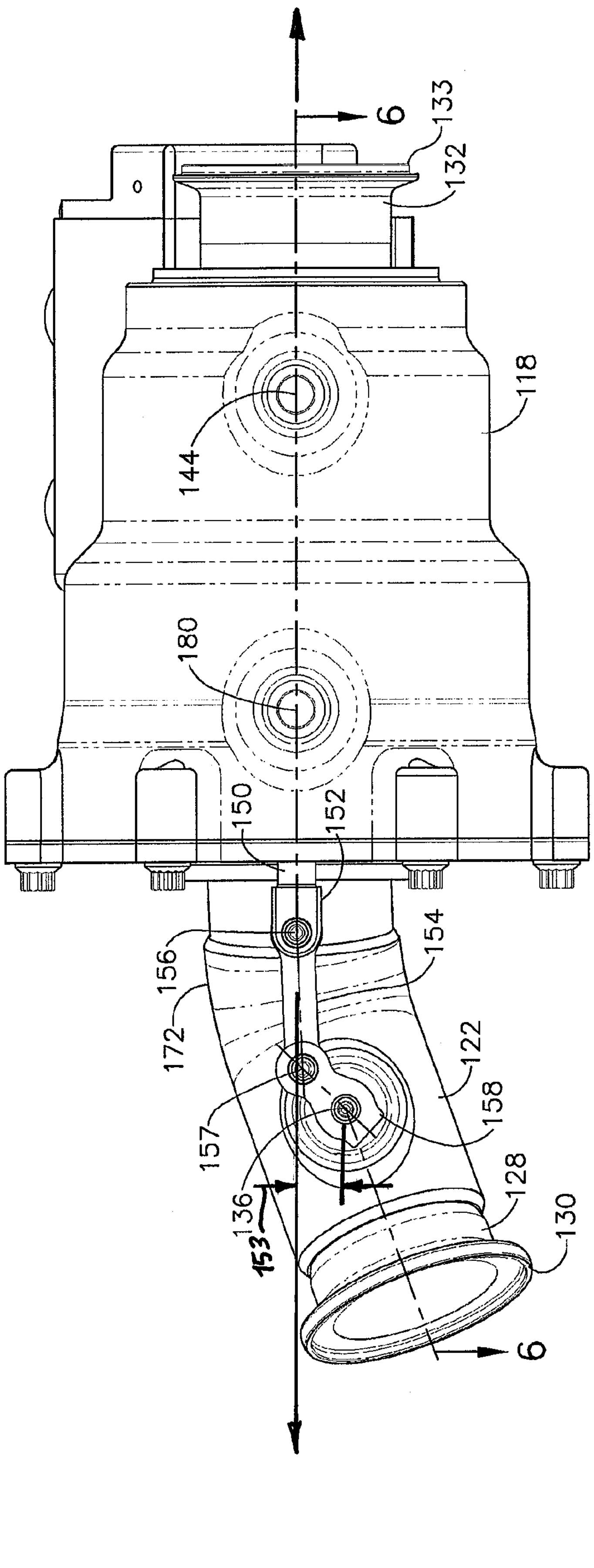
FIG. 5 is a side view of one exemplary embodiment of a valve assembly.
Figure 6:
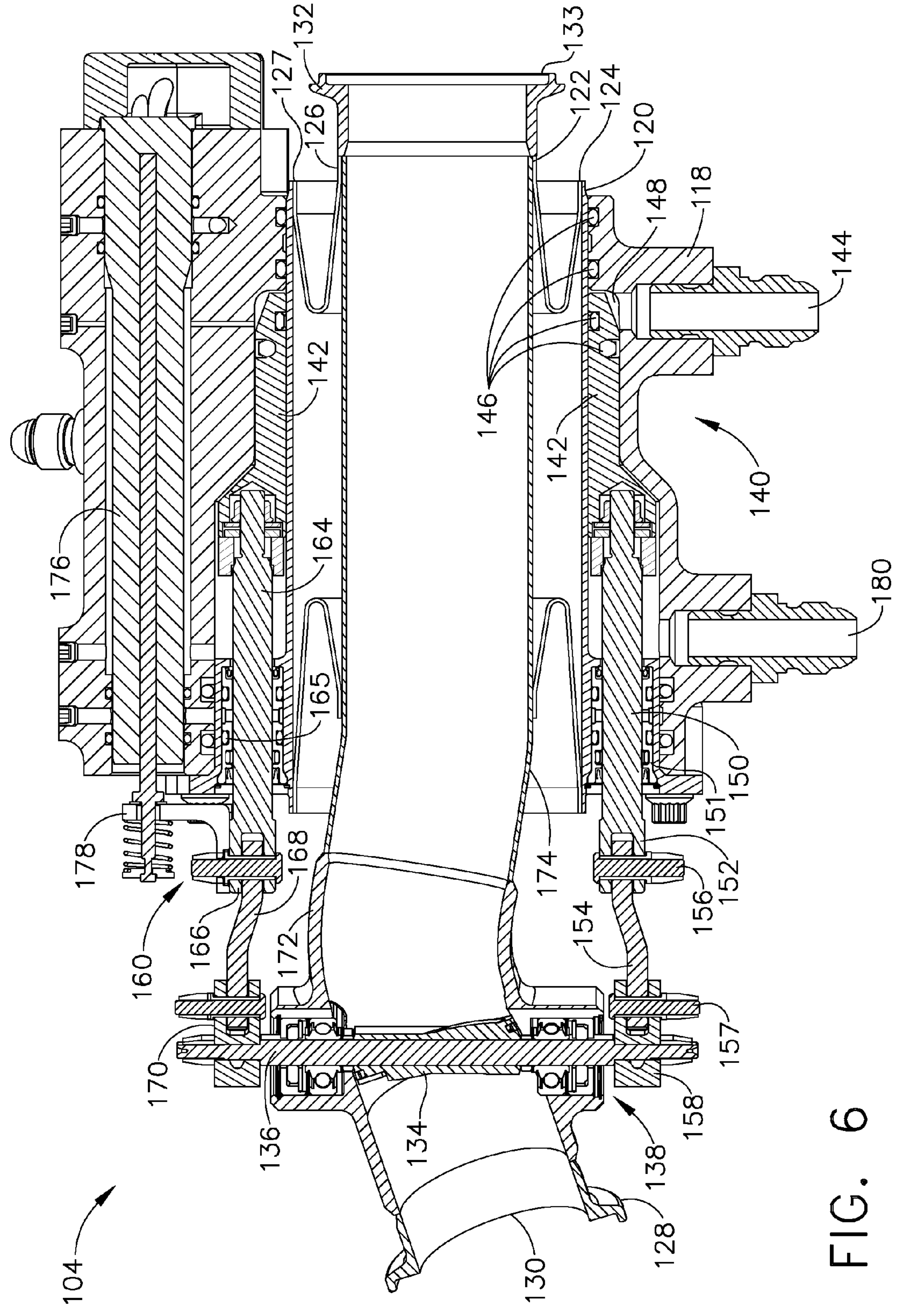
FIG. 6 is a cross sectional view of one exemplary embodiment of a valve assembly taken along sectional line 6-6 in FIG. 5.

FIG. 1 is a bottom view of a gas turbine engine 100 having a plurality of ducts 102 that may include one or more valve assemblies 104. The engine 100 includes a compressor 106, a combustor 108, and a turbine 110. The engine 100 may also include an additional turbine 112 and a fan assembly 114, shown in phantom. In one exemplary embodiment, the ducts 102 and valve assemblies 104 may form a portion of a transient bleed system 116. More specifically, the ducts 102 and valve assemblies 104 facilitate channeling and controlling, respectively, fluid flow at a high temperature, and/or at a high pressure, from one area of the engine 100 for use in another area. For example, in one exemplary embodiment, fluid flowing through the ducts 102 and valve assemblies 104 has an operating temperature that is greater than 800° F. and/or an operating pressure of greater than 300 PSI.

Referring now to FIGS. 2-6, the valve assembly 104 may include a first body 118 that may partially or completely surround a second body 120. The first body 118 and second body 120 may be annular structures for housing and supporting the components of the valve assembly 104. A flow tube 122 may be supported within the second body 120 by a support 124. The first body 118, second body 120 and flow tube 122 may be any diameters known in the art and may be the same diameter throughout or change at a point or points along their lengths. The support 124 may be any structure known in the art that will allow the flow tube 122 to expand and contract due to changes in temperature and pressure of the fluid flowing through the flow tube 122 and to support vibration induced loads. In one exemplary embodiment, the support 124 is a formed piece of sheet metal that may be attached to the second body 120 at a first end 126 and the flow tube 122 at a second end 127. In one exemplary embodiment, the support 124 may be formed as two or more pieces, where one is attached at the inlet side of the second body 120 and one is attached at the outlet side of the second body 120.

The flow tube 122 may include an inlet portion 128 having an inlet 130 for receiving fluid flowing through the flow tube 122 and an outlet portion 132 having an outlet 133 for transferring fluid downstream of the flow tube 122. A valve 134 is disposed within the flow tube 122. The valve 134 may be any type of valve known in the art. In one exemplary embodiment, the valve 134 is a butterfly valve. The valve 134 may be selectively positionable between an open position, a closed position and anywhere therebetween. An axle 136 may connect the valve 134 to the flow tube 122 and selectively position the valve 134. The axle 136 may pass through the valve 134 and connect to the flow tube 122 through a bearing assembly 138. The axle 136 may be substantially perpendicular to the axis of the first body 118 and second body 120. The axle 136 may also be offset from a plane that is parallel with the axle 136 and that passes through the center of the first body 118 and second body 120.

A piston assembly 140 may be used to actuate the axle 136 and valve 134. A piston 142 may be disposed between the first body 118 and the second body 120. A port 144 may be connected to the first body 118 for providing actuation fluid to the piston 142. The port 144 may be positioned such that the pressure drop of the fluid may be minimized. A plurality of seals 146 may be disposed in proximity to the piston 142 for sealing an actuation cavity 148. The actuation cavity 148 may fill with actuation fluid to actuate the valve 134. The piston 142 may be connected to a piston rod 150. A bushing 151 may be disposed around said piston rod 150. The bushing 151 may guide and seal the piston rod 150. A piston rod clevis 152 may be disposed on the piston rod 150 at the end opposite the piston 142. The piston 142, piston rod 150, bushing 151 and piston rod clevis 152 may be arranged so as to be parallel to the axis of the first body 118 and second body 120. A link arm 154 may be connected to the piston rod clevis 150 at one end by a pin 156 and to an axle crank arm 158 at another end by a pin 157. The axle crank arm 158 may be connected to one end of the axle 136. The axle crank arm 158 may be connected such that the axle 136 rotates when the axle crank arm 158 rotates. The piston assembly 140 may have a second piston rod 164 disposed 180 degrees from the piston rod 150 so as to balance the piston force around the piston 142. The piston rod 164 may be connected to the piston 142 in an arrangement similar to that described above. A bushing 165, a piston rod clevis 166, a link arm 168 and an axle crank arm 170 may be associated with the piston rod 164. The piston rods 150, 164 each may convert the rectilinear force of the piston 142 into rotary force at the axle 136, causing the axle 136 to rotate, thus causing the valve 134 to open or close, depending on the movement of the piston 142.

The flow tube 122 may include a first bend 172 and a second bend 174. The first bend 172 may allow the axle 136 to be positioned so that it is offset from a plane passing through the piston rods 150 and 164 (see offset 153 noted in FIG. 5). The second bend 174 may allow the valve 134 to be centered between the piston rods 150 and 164. This may allow the axle crank arms 158 and 170 to be substantially aligned with the piston rods 150 and 164. Such an arrangement may allow a direct connection between the axle 136 and piston rods 150, 164 without the need for a wishbone assembly.

A sensor 176 may be disposed adjacent to the piston assembly 140. The sensor 176 may be disposed such that it senses the position of the piston 142 in order to provide feedback to the engine on the position of the valve 134. Any position sensor known in the art may be used. In one exemplary embodiment, a linear variable differential transformer (LVDT) may be used. The sensor 176 may be attached to the piston rod 150, 162 with an L-bracket 178. It should be noted that any attachment arrangement may be used so long as the sensor can detect the position of the piston 142.

Figure 7:
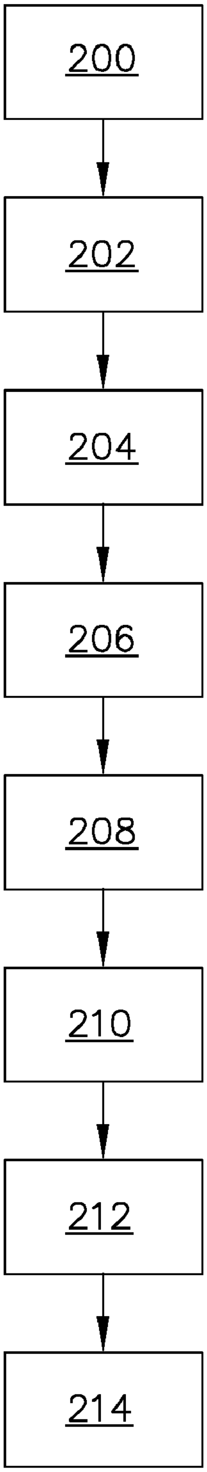
FIG. 7 is a flow chart illustrating one exemplary embodiment of a method for regulating fluid flow.

As shown in FIG. 7, during use, fluid may flow through the inlet 130 of the flow tube 122 at step 200. The fluid may change direction within the flow tube 122 at the first bend 172 at step 202. The fluid may change direction a second time within the flow tube 122 at the second bend 174 at step 204. Actuation fluid may flow from the port 144 to the actuation cavity 148 at step 206. Any actuation fluid known in the art may be used. At step 208, the actuation fluid will cause the piston 142 to move axially towards the valve 134. The piston rod 150, 164 and piston rod clevis 152, 166 will also move axially towards the valve 134 with the movement of the piston 142 at step 210. The rectilinear force may further be transferred to the axle crank arm 158, 170 through the link arm 154, 168 at step 212. The rectilinear force of the axle crank arm 158, 170 will be transferred to the axle 136 as rotary force, thereby causing the axle 136 and attached valve 134 to rotate at step 214. The valve 134 may be actuated to change from open to closed, closed to open or somewhere in between. A second port 180 may provide actuation fluid to the actuation cavity 148, causing the port 144 to act as an outlet, causing the valve 134 to close. The valve 134 may be actuated for a plurality of reasons, including, but not limited to, stall conditions, redistributing high-pressure flow to the aft part of the engine, lower inlet pressure to the combustor, engine anti-icing, wing anti-icing, controlling blade tip clearances, providing air to environmental control systems and/or auxiliary power units on the airplane or any combination thereof. The initial position may be either open or closed. Since the piston 142, piston rod 150, piston rod clevis 152, link arm 154 and axle crank arm 158 are aligned axially, the force transferred to the axle and valve may be more direct and balanced, thus reducing the transient forces applied to the valve.

This written description discloses exemplary embodiments, including the best mode, to enable any person skilled in the art to make and use the exemplary embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A valve assembly, comprising:

a body having an axis passing through a center of the body;

a flow tube supported within and extending through said body, the flow tube being supported by a formed piece of sheet metal disposed between said body and said flow tube;

a valve disposed within said flow tube and having an axle that is substantially perpendicular to said axis, said axle extending through and mounted for rotation relative to the flow tube; and a piston disposed in said body which is mechanically coupled to distal ends of said axle by two spaced-apart piston rods, said piston and said piston rods being mounted for rectilinear motion parallel to said axis;

wherein said axle is offset from a plane which lies parallel to the axis and the axle, and which passes through the axis and both piston rods.

2. The valve assembly of claim 1 further comprising:

a piston rod clevis disposed at one end of each of said piston rods.

3. The valve assembly of claim 2 further comprising:

a link arm disposed between each of said piston rod clevises and the respective distal end of said axle.

4. The valve assembly of claim 3 wherein each of said distal ends of said axle has an axle crank arm extending therefrom and each of said link arms extends between one of the respective piston rod clevis and the respective axle crank arm.

5. The valve assembly of claim 4 further comprising:

a sensor attached to said piston rod for detecting the position of said piston.

6. The valve assembly of claim 1 further comprising:

an actuation cavity disposed between said body and said piston.

7. The valve assembly of claim 6 further comprising:

a port attached to said body and in fluid communication with said actuation cavity.

* * * * *